United States Patent [19]
Zaid

[11] Patent Number: 5,344,818
[45] Date of Patent: Sep. 6, 1994

[54] WELL TREATING COMPOSITION

[75] Inventor: Najib H. Zaid, Sterling, Kans.

[73] Assignee: Jacam Chemical Partners, Ltd., Sterling, Kans.

[21] Appl. No.: 139,285

[22] Filed: Oct. 20, 1993

[51] Int. Cl.$^5$ .................................................. C09K 7/02
[52] U.S. Cl. ................................... 507/131; 507/139; 252/8.551
[58] Field of Search .............................. 507/131, 139; 252/8.551

[56] References Cited

U.S. PATENT DOCUMENTS

| | | | |
|---|---|---|---|
| 2,940,729 | 6/1960 | Rakowitz | 255/1.8 |
| 3,580,337 | 5/1971 | Gogarty | 166/273 |
| 4,232,740 | 11/1980 | Park | 166/276 |
| 4,318,835 | 3/1982 | Clarke | 264/36 |
| 5,213,446 | 5/1993 | Dovan | 405/128 |

Primary Examiner—Gary Geist
Attorney, Agent, or Firm—Hovey, Williams, Timmons & Collins

[57] ABSTRACT

Improved mud additive compositions are provided which are especially formulated to control hole enlargement due to salt bed erosion during drilling, and to assist in solubilization of deposited salt during well operations. The compositions include a first ingredient such as sodium or potassium ferrocyanide and mixtures thereof, and a second ingredient such as the trisodium salt of nitrilotriacetic acid and alkali metal citrates. The first ingredient is generally present at a level of from about 50-95% by weight in the particulate, dilutable form of the invention, whereas the second ingredient is present at a level of from about 5-50% by weight. The compositions hereof may be added to drilling mud during drilling operations or to fresh water for removing salt depositions.

16 Claims, No Drawings

WELL TREATING COMPOSITION

BACKGROUND OF THE INVENTION

1. Field of the Invention

The present invention is broadly concerned with improved mud additive compositions particularly formulated for treatment of wells characterized by the presence of downhole iron, in order to minimize hole enlargement when salt beds are encountered during the drilling process, and to reduce the need for fresh water in the control of salt deposition within the well. More particularly, the invention pertains to an aqueous composition including a first ingredient such as sodium or potassium ferrocyanide and mixtures thereof, and a second ingredient such as the trisodium salt of nitrilotriacetic acid or alkali metal citrates and mixtures thereof; the composition is added to recirculating drilling mud and lessens salt erosion even in the case of wells having high concentrations of iron therein. The composition may be added to circulation water to enhance solubilization of salt within the well.

2. Description of the Prior Art

During the course of oil well drilling operations, it sometimes occurs that a salt bed is encountered. When this happens, typical clay-based aqueous drilling mud can quickly erode the salt formation by dissolving salt, thereby creating a washed out annular zone. When this occurs, additional cement is needed to fill the hollowed out zone, thereby increasing drilling costs. The drill string may also become stuck as fluid velocity falls below cutting particle slip velocity in the widened zone, thereby causing particles to settle and bind the drill string. Furthermore, the hole enlargement greatly complicates formation evaluation efforts.

In response to these problems, it is conventional practice to add salt or saturated brine to the drilling mud through a hopper mixing system or fluid jetting system at the mud pit. In this way, annular erosion is lessened. However, this expedient is not entirely satisfactory, owing to the fact that downhole conditions of increasing temperature with depth enable brines that are salt-saturated at surface temperatures to dissolve additional salt in the well bore. As the resulting super-saturated brines are circulated to the surface and cooled, salt precipitates from the aqueous system. This precipitation can create a disposal problem in the pits and enables the brine to dissolve additional well bore salt during the next circulation.

Drilling mud additives have been commercialized in the past which serve to prevent dilution of the brine fraction of the recirculating drilling mud. One such amine-based additive is presently available, but costs about $22 per gallon. Sodium ferrocyanide is a very effective and relatively inexpensive treating agent, and is therefore preferred. However, sodium ferrocyanide has a significant drawback in that if the well and its products contain iron, the effectiveness of the treatment is drastically reduced, and a blue, scale-like amorphous substance is deposited on downhole equipment. This leads to downtime and loss of production, and even a need to replace downhole equipment.

During the course of oil or gas production, some wells may produce high chloride brines which tend to deposit salt on well equipment. This can adversely affect well production. One solution to this problem is to circulate fresh water through the well to dissolve the deposited salt. However, large volumes of fresh water may be required for this purpose.

There is accordingly a real and unsatisfied need in the art for an improved composition making use of an inexpensive ferrocyanide for brine control during drilling and well operation, while at the same time having the ability to effectively operate in downhole environments characterized by the presence of iron.

SUMMARY OF THE INVENTION

The present invention overcomes the problems outlined above, and provides a downhole well treating composition comprising (and preferably consisting essentially of) a first ingredient selected from the group consisting of sodium and potassium ferrocyanide and mixtures thereof and a second ingredient selected from the group consisting of the trisodium salt of nitrilotriacetic acid (NTA) and alkali metal citrates and mixtures thereof. Such a composition may be supplied in particulate form and diluted in aqueous medium at the well site. At this point, the liquid composition may be introduced into the well, typically by addition thereof to the recirculating drilling mud and/or to fresh water. In practice, it has been found that a composition of this character effectively controls the salt erosion problem and eliminates the characteristic blue scale formation encountered in wells having significant downhole iron contents. Moreover, when used with recirculating water, it assists in solubilization of deposited salt to facilitate well operations.

DETAILED DESCRIPTION OF THE PREFERRED EMBODIMENTS

Sodium ferrocyanide is the most preferred brine-control agent for use in compositions of the invention. This material is commercially available as "DS-1000" and can be obtained from Northern Chemical, Inc. A product information sheet distributed by Northern Chemical and describing the DS-1000 product is incorporated by reference herein. Sodium ferrocyanide is also available from JaCam Chemical Partners, Ltd. of Sterling, KS under the designation of "DeSalt" or "Salt Inhibitor".

It has been found that the addition of sodium or potassium ferrocyanide to brine increases the concentration of sodium chloride therein. When crystallization of the sodium chloride takes place, the resultant salt crystals become more pyramidal (dendritic salt) instead of cubical. This increased salt concentration in the brine renders it particularly useful in the context of oil well treatments.

NTA (CAS #5064-31-3) is normally employed as the second ingredient of the compositions of the invention. This product is available from Monsanto Industrial Chemicals Co. of St. Louis, Mo. as a white crystalline powder or essentially clear, colorless to pale yellow liquid. The Monsanto NTA product is a trisodium salt of nitrilotriace-tic acid, monohydrate, and is fully described in a Monsanto trade publication entitled "NTA"; this publication is incorporated by reference herein.

The alkali metal citrates, and particularly sodium citrate, are effective alternatives to the use of NTA. When such a citrate is employed, it may be used in pure form or in conjunction with other ingredients. For example, compositions of the type described in U.S. Pat. No. 4,839,086 (incorporated by reference herein) can be used in the context of the present invention.

Preferred particulate, dilutable downhole well treatment compositions in accordance with the invention include from about 50–95% by weight of a first ingredient selected from the group consisting of sodium and potassium ferrocyanide and mixtures thereof, with the sodium salt being the most commonly employed. The compositions also include from about 5–50% by weight of a second ingredient taken from the group consisting of the trisodium salt of nitrilotriacetic acid and the alkali metal citrates and mixtures thereof. These levels are even more preferably from about 55–75% by weight for the first ingredient, and correspondingly from about 25–45% by weight for the second ingredient. The single most preferred levels of use are about 65% by weight for the first ingredient, and about 35% by weight for the second ingredient.

In actual practice, the particulate composition described above is dispersed in an aqueous medium (usually plain water or brine) and has a pH in the range of from about 6.5–10.5. Generally speaking, the first ferrocyanide ingredient should be present in the aqueous medium at a level of from about 1–12% by weight, and more preferably from about 8–12% by weight. The second ingredient in the medium at a level of from about 2–10% by weight, and more preferably from about 3–7% by weight.

The aqueous treating compositions of the invention are introduced into a well in order to control the salt erosion problem, even in the case of wells having significant iron contents. While such introduction may be effected in a number of ways, generally speaking it is preferred to add the liquid compositions to the recirculating drilling mud. Typically, this would be done by addition of the agents at the mud pit where jets can be used to stir the supplemented mud prior to recirculation downhole. Alternatively, solid agents may be mixed with the mud through a conventional hopper assembly. The compositions should be added to the drilling mud at a level of from about 30–250 ppm, and more preferably at a level of from about 50–170 ppm.

Actual field usage of the treating compositions of the invention demonstrates that they are very effective in controlling salt erosion without formation of the characteristic blue scale. It is believed that the second ingredient reacts with downhole iron, thereby neutralizing the effect of the iron and preventing scale formation.

The presence of NTA not only enhances the performance of the ferrocyanide component, but also provides a method for determining the presence of the product in drilling mud, which can in turn be used as a lost circulation detector. Specifically, a sample of drilling mud liltrate may be acidified to approximately pH 3, followed by the addition of 4–5 crystals of ferrous ammonium sulfate. If the product of the invention is present in the mud filtrate, a blue color develops; the darker the blue color, the greater the concentration of the ferrocyanide in the mud filtrate. In effect, the NTA maintains the ferrocyanide in a condition which will generate the desired colorimetric reaction upon acidification and addition of ferrous ammonium sulfate. This colorimetric reaction is useful, for example, to identify instances of mud filtrate production from a potentially productive formation, where the mud filtrate has been introduced to the formation as a consequence of lost circulation.

In addition, the composition hereof may be added to fresh circulation water at the ppm levels indicated above, to serve as a medium for dissolving deposited salt on downhole well equipment. Use of the composition hereof reduces the amount of fresh water need for this purpose.

I claim:

1. A downhole oil well treating composition for treating wells characterized by the presence of downhole iron, said composition comprising a first ingredient selected from the group consisting of sodium and potassium ferrocyanide and mixtures thereof and a second ingredient selected from the group consisting of the trisodium salt of nitrilotriacetic acid and alkali metal citrates and mixtures thereof.

2. The composition of claim 1, said first ingredient being present at a level of from about 50–95% by weight, and second ingredient being present at a level of from about 5–50% by weight.

3. The composition of claim 2, said first ingredient being present at a level of from about 55–75% by weight, and said second ingredient being present at a level of from about 25–45% by weight.

4. The composition of claim 3, said first ingredient being present at a level of about 65% by weight, and second ingredient being present at a level of about 35% by weight.

5. The composition of claim 1, the composition consisting essentially of said first and second ingredients.

6. The composition of claim 1, said composition being in the form of a powder dispersible in an aqueous medium to give a pH of from about 6.5–10.5.

7. The composition of claim 1, said first ingredient being sodium ferrocyanide.

8. The composition of claim 1, said second ingredient being the trisodium salt of nitrilotriacetic acid, monohydrate.

9. An aqueous downhole oil well treating composition for treating wells characterized by the presence of downhole iron, said composition comprising a first ingredient selected from the group consisting of sodium and potassium ferrocyanide and mixtures thereof and a second ingredient selected from the group consisting of the trisodium salt of nitrilotriacetic acid and alkali metal citrates and mixtures thereof, said first and second ingredients being dispersed in an aqueous medium.

10. The composition of claim 9, the composition consisting essentially of said first and second ingredients dispersed in said aqueous medium.

11. The composition of claim 9, said composition having a pH of from about 6.5–10.5.

12. The composition of claim 9, said first ingredient being potassium ferrocyanide.

13. The composition of claim 9, said second ingredient being the trisodium salt of nitrilotriacetic acid, monohydrate.

14. The composition of claim 9, said first ingredient being present in said aqueous medium at a level of from about 1–12% by weight.

15. The composition of claim 9, said second ingredient being present in said aqueous medium at a level of from about 2–10% by weight.

16. The composition of claim 9, said aqueous medium being water.

* * * * *